United States Patent [19]

Katto et al.

[11] Patent Number: 4,686,480
[45] Date of Patent: Aug. 11, 1987

[54] WAVE GENERATION CIRCUIT FOR A PULSE-WIDTH MODULATION INVERTER

[75] Inventors: Masayuki Katto, Nagoya; Eiichi Sugishima, Nagoya, both of Japan

[73] Assignee: Mitsubishi Denki Kabushiki Kaisha, Tokyo, Japan

[21] Appl. No.: 656,734

[22] Filed: Oct. 1, 1984

Related U.S. Application Data

[63] Continuation-in-part of Ser. No. 550,216, Nov. 9, 1983, abandoned.

[30] Foreign Application Priority Data

Nov. 17, 1982 [JP] Japan .................................. 57-201529

[51] Int. Cl.$^4$ .......................... G06F 3/00; H03K 5/00
[52] U.S. Cl. .................................... 328/62; 328/155; 307/262; 364/721
[58] Field of Search ........................ 328/62, 63, 155; 307/261, 262, 269; 364/718, 721, 851

[56] References Cited

U.S. PATENT DOCUMENTS

| 4,159,527 | 6/1979 | Yahata et al. | 328/155 |
| 4,306,190 | 12/1981 | Beckwith et al. | 328/62 |
| 4,327,420 | 4/1982 | Gdula et al. | 364/721 |

Primary Examiner—Stanley D. Miller
Assistant Examiner—Timothy P. Callahan
Attorney, Agent, or Firm—Wenderoth, Lind & Ponack

[57] ABSTRACT

A wave generation circuit for a pulse width modulation inverter generates a plurality of differently phased waves which are modulated to form driving signals for switching elements in the inverter. This circuit has a single memory element having waveform data stored therein and also has an operation circuit for providing phase address signals which indicate the address of the waveform data corresponding to each phase. The data at the indicated addresses are read out of the memory element and latched by a phase latch circuit for each phase. When all of the stored data corresponding to each phase have been latched, the operation circuit transmits an output timing signal to cause the phase latch circuits to simultaneously provide the latched data which form driving signals for the switching elements.

12 Claims, 25 Drawing Figures

WAVE GENERATION CIRCUIT FOR A PULSE-WIDTH MODULATION INVERTER

CROSS REFERENCE TO RELATED APPLICATIONS

This application is a continuation-in-part of now abandoned U.S. Application Ser. No. 550,216 filed Nov. 9, 1983, abandoned.

BACKGROUND OF THE INVENTION

This invention relates to a pulse-width modulation inverter for driving an AC motor or the like, and in particular to a wave generation circuit for generating waves used to form driving signals for switching elements in a pulse-width modulation inverter.

Figure 1:
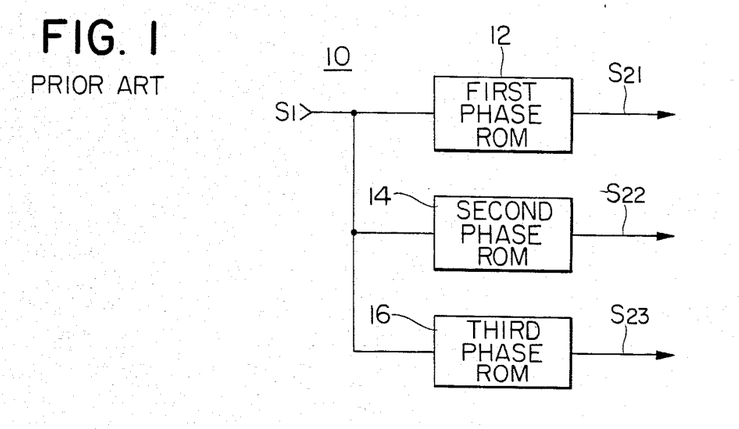
FIG. 1 is a circuit diagram of a conventional wave generation circuit for a pulse width modulation inverter.
Figure 2:
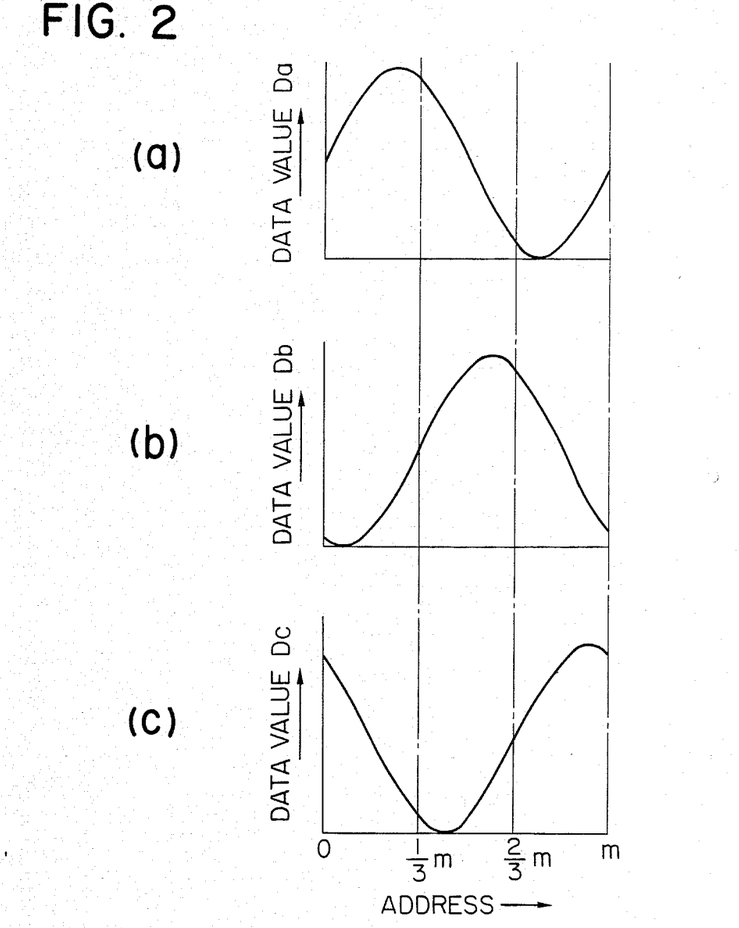
FIGS. 2(a), 2(b), and 2(c) are graphs of waveform data values stored in memory elements in the circuit of FIG. 1 plotted as a function of address.
Figure 4:
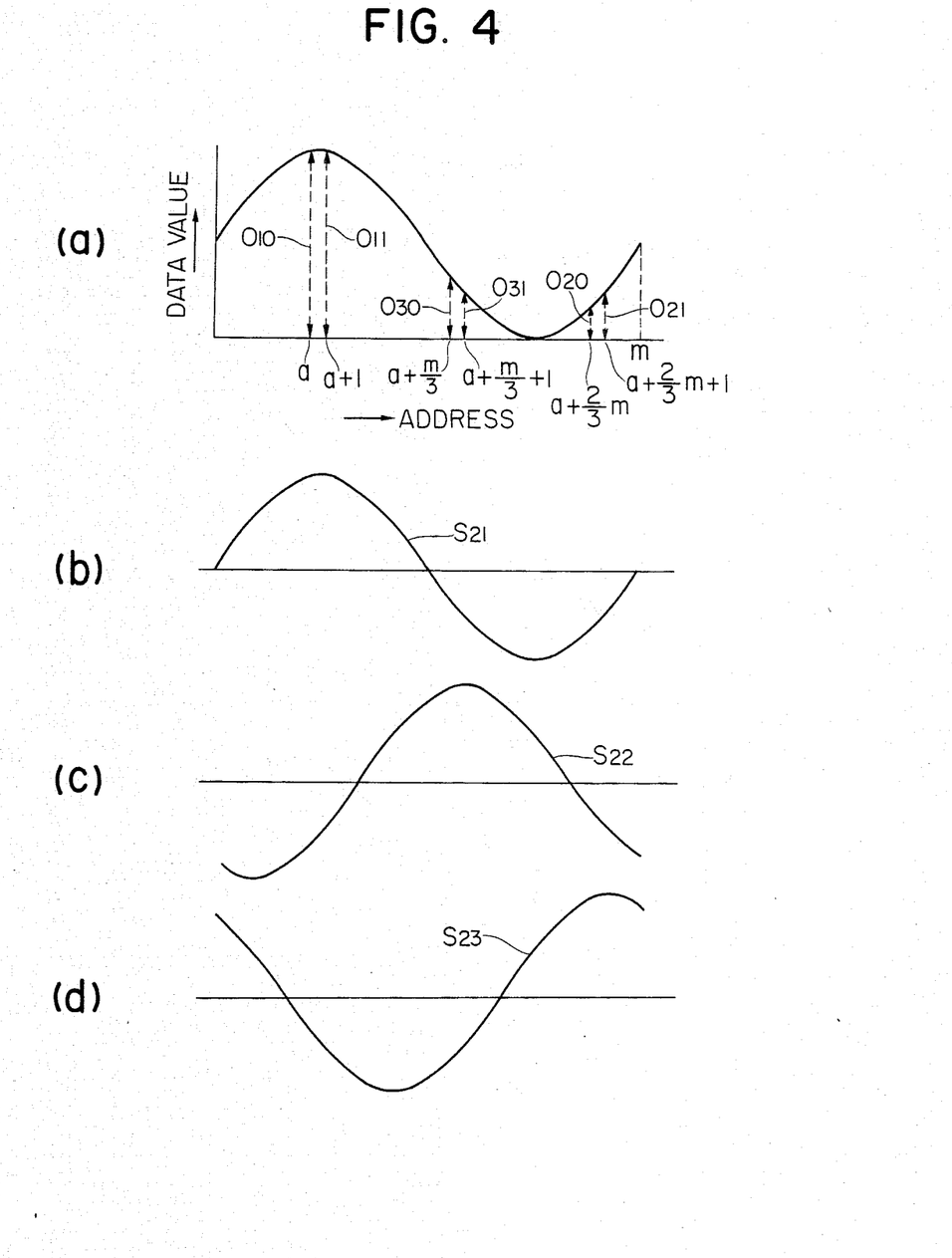

A conventional wave generation circuit for a pulse-width modulation inverter used to generate waves of three different phases is illustrated in FIG. 1, generally designated by reference numeral 10. The generated waves form a plurality of reference sine waves. The reference sine waves are then compared with a saw tooth carrier wave to form pulse width modulated waves which serve as driving signals for the inverter, as is well known in the art. In the figure, an address signal $S_1$ is provided for first, second, and third phase Read Only Memories (hereinafter called ROM's) 12, 14, and 16 which respectively provides as outputs the waveform data $S_{21}$, $S_{22}$, and $S_{23}$ for the three differently phased waves generated by the circuit 10. The ROM's 12, 14, and 16 have been respectively provided with stored waveform data Da, Db, and Dc for the generated waves over memory addresses 0-m. As can be seen from FIGS. 2(a), 2(b), and 2(c), the value of Da at a given address is equal to the value of Db at the address + m/3, where m is the total number of address in each ROM, and similarly, the value of Db at a given address equals the value of Dc at that address + m/3. The address signal $S_1$ has a desired frequency corresponding to the output frequency of the inverter. In response to the address signal $S_1$, the ROM's 12, 14, and 16 provide as outputs the three-phase waveform data $S_{21}$, $S_{22}$, and $S_{23}$ separated by a phase difference of 120 degrees, as shown in FIGS. 4(b), 4(c), and 4(d).

The conventional circuit illustrated in FIG. 1 has the disadvantage of high cost due to the necessity of expensive memory elements (for example, ROM's) corresponding in number to the number of phases used. Also, with the conventional circuit, it is difficult to make modifications of the waveform data.

Accordingly, it is an object of the invention to provide a wave generation circuit for a pulse width modulation inverter in which the number of expensive memory elements used is as few as possible.

SUMMARY OF THE INVENTION

In accordance with the present invention, an improved wave generation circuit for a pulse-width modulation inverter is provided to generate a plurality of differently-phased waves which are then modulated to form driving signals for switching elements in the inverter. The wave generation circuit comprises a memory means, an operation means, and a phase latch means. The memory means has stored therein at a plurality of addresses reference waveform data for the waves to be generated. The operation means provides address signals for each phase to the memory means, the difference between the addresses indicated by the address signals corresponding to the phase difference between the generated waves, and transmits the phase address signals to the memory means to cause the memory means to provide the stored data as an output. The phase latch means receives phase latch command signals provided from the operation means in synchronization with the phase address signals to latch the corresponding stored data provided from the memory means and receives an output timing signal transmitted from the operation means when the corresponding stored data for each phase are all latched to cause the phase latch means to provide as an output the latched data. The operation means provides new address signals at predetermined intervals to cause the phase latch means to transmit the waveform data of the waves for each phase.

The length of the predetermined intervals is preferably the reciprocal of the product of the number of addresses of the memory means and a predetermined wave frequency. Assuming the number of phases to be n, the operation means provides address signals corresponding to each phase differing from each other by an integral multiple of m/n, which is the total number m of addresses of the memory means divided by n.

BRIEF DESCRIPTION OF THE DRAWINGS

FIG. 4(a) shows address data which is stored in the memory element in FIG. 3, and FIGS. 4(b)–(d) show output waveforms of the wave generation circuit in FIG. 3;

DETAILED DESCRIPTION OF THE INVENTION

Further objects and advantages of the present invention will be apparent from the following description, reference being has to the accompanying drawings.

Figure 3:
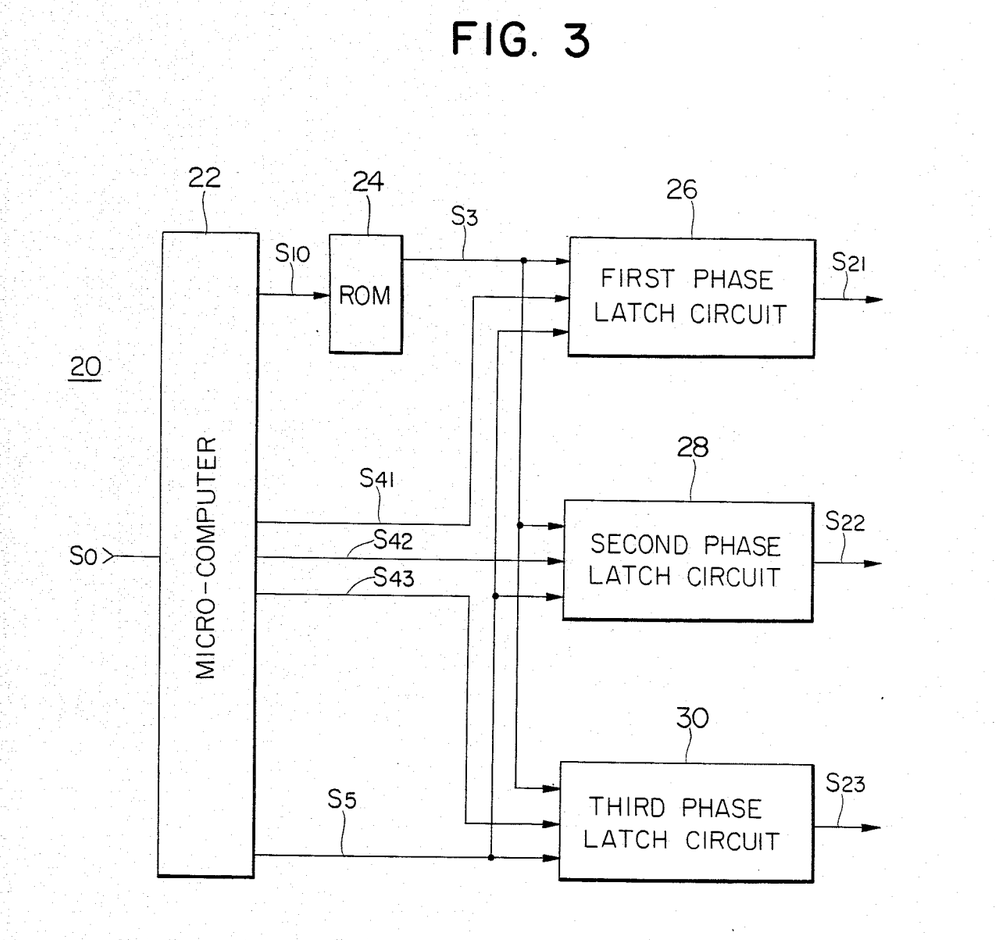
FIG. 3 is a circuit diagram of one embodiment of the present invention.

FIG. 3 shows one embodiment of a wave generation circuit for a pulse width modulation inverter according to the present invention. The wave generation circuit is generally designated by reference numeral 20 in which a microcomputer 22, a ROM 24, and first, second, and third phase latch circuits 26, 28, and 30, respectively, are included. The microcomputer 22 which acts as an operation circuit has an input portion for receiving a command signal $S_0$ of a wave frequency f, a first output portion connected to the ROM 24 (a memory element) which provides an address signal $S_{10}$, a second output portion providing latch command signals $S_{41}$, $S_{42}$, and $S_{43}$ to the latch circuits 26, 28, and 30, respectively, and a third output portion providing an output timing signal $S_5$ to all of the latch circuits 26, 28, and 30. The ROM 24 has an output portion providing a waveform data signal $S_3$ to all of the latch circuits 26, 28, and 30. The three latch circuits 26, 28, and 30 respectively provide as outputs the waveform data $S_{21}$, $S_{22}$, and $S_{23}$, as is the case in the circuit in FIG. 1, also.

In the operation of the embodiment shown in FIG. 3, the ROM 24 has reference waveform data (e.g. 8-bit data) which has been previously stored in addresses 0-m as shown in FIG. 4(a). In response to the reception of the address signal $S_{10}$, the ROM 24 is made to provide as an output the corresponding waveform data signal $S_3$. This address signal $S_{10}$ is transmitted by the microcomputer 22 at predetermined intervals in response to the command signal $S_0$. The length of the predetermined intervals is, for example, (the total number of addresses m × the generated wave frequency f)$^{-1}$.

The address signal $S_{10}$ comprises three different phase address signals. The addresses indicated by each of the phase address signals are shown below in Equation (1). It can be seen that the addresses indicated by any two of the phase address signals differ by an integral multiple of m/n, where n is the number of phases.

$$\left. \begin{array}{ll} \text{first phase address} & a \\ \text{second phase address} & a + \tfrac{2}{3} m \\ \text{third phase address} & a + \tfrac{1}{3} m \end{array} \right\} \quad (1)$$

When the above equations give a value greater than m, the correct address is found by subtracting m from that value.

After receiving the address signal $S_{10}$, the ROM 24 then provides data signal $S_3$ which comprises the data ($0_{10}$, $0_{20}$, and $0_{30}$) stored at each of the three addresses (a, a+m/3, a+2m/3) indicated by address signal $S_{10}$. This is shown in FIG. 5(b).

Each of the phase latch circuits 26, 28, and 30 is used as a controller for latching the stored data $0_{10}$, $0_{20}$, or $0_{30}$ transmitted from the ROM 24 and for providing them simultaneously as outputs. Therefore, they are supplied with the latch command signals $S_{41}$, $S_{42}$, and $S_{43}$, respectively, as well as with the output timing signal $S_5$ from the microcomputer 22. Thus, the latch circuits 26, 28, and 30 respectively receive a first latch command signal $S_{41}$ (FIG. 5(c)), a second latch command signal $S_{42}$ (FIG. 5(d)), and a third latch command signal $S_{43}$ (FIG. 5(e)) which are sent out of the microcomputer 22 in synchronization with each of the three signals forming phase address signal $S_{10}$. At the time of reception, the latch circuits 26, 28, and 30 respectively latch the stored data $0_{10}$, $0_{20}$, and $0_{30}$ provided as outputs from the ROM 24 as seen in FIGS. 4(f)–(h).

Figure 5:
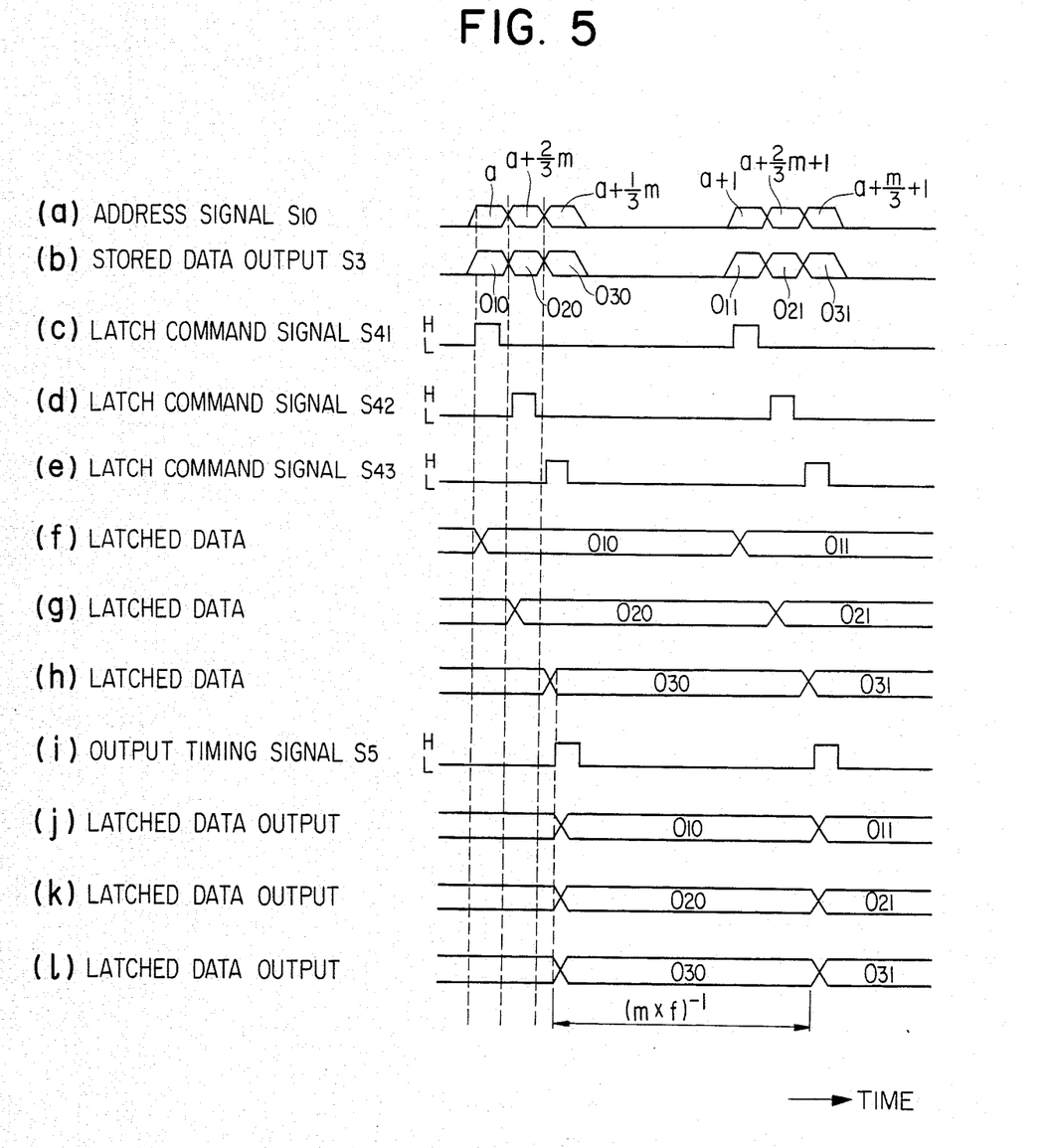
FIGS. 5(a)–(l) are time charts of the various portions of the wave generation circuit in FIG. 3.

All of the latch circuits 26, 28, and 30 simultaneously receive the output timing signal $S_5$ (FIG. 5(i)) transmitted from the microcomputer 22 after all of the stored data $0_{10}$, $0_{20}$, and $0_{20}$ have been latched but before the subsequent address signal $S_{10}$ has been transmitted from the microcomputer 22, and as a result provide phase latched data $0_{10}$, $0_{20}$, and $0_{30}$ as outputs as shown in FIGS. 5(j)–(l).

The microcomputer 22 then adds 1 to each of the previous phase address values to calculate the new phase address values given by the following Equation (2) and forms the next address signal $S_{10}$ (see the right side of FIG. 5(a)) which is sent to the ROM 24 to repeat the above operations.

$$\left. \begin{array}{ll} \text{new first address} & a + 1 \\ \text{new second address} & a + \tfrac{2}{3} m + 1 \\ \text{new third address} & a + \tfrac{1}{3} m + 1 \end{array} \right\} \quad (2)$$

The repetition of the above procedures at the predetermined intervals of (the total number of addresses m × the modulated wave frequency f)$^{-1}$ will provide the waveform data for the waves shown in FIGS. 4(b)–(d). When a value calculated according to Equation (2) is greater than m, the actual phase address is found by subtracting m from that value.

Figure 6:
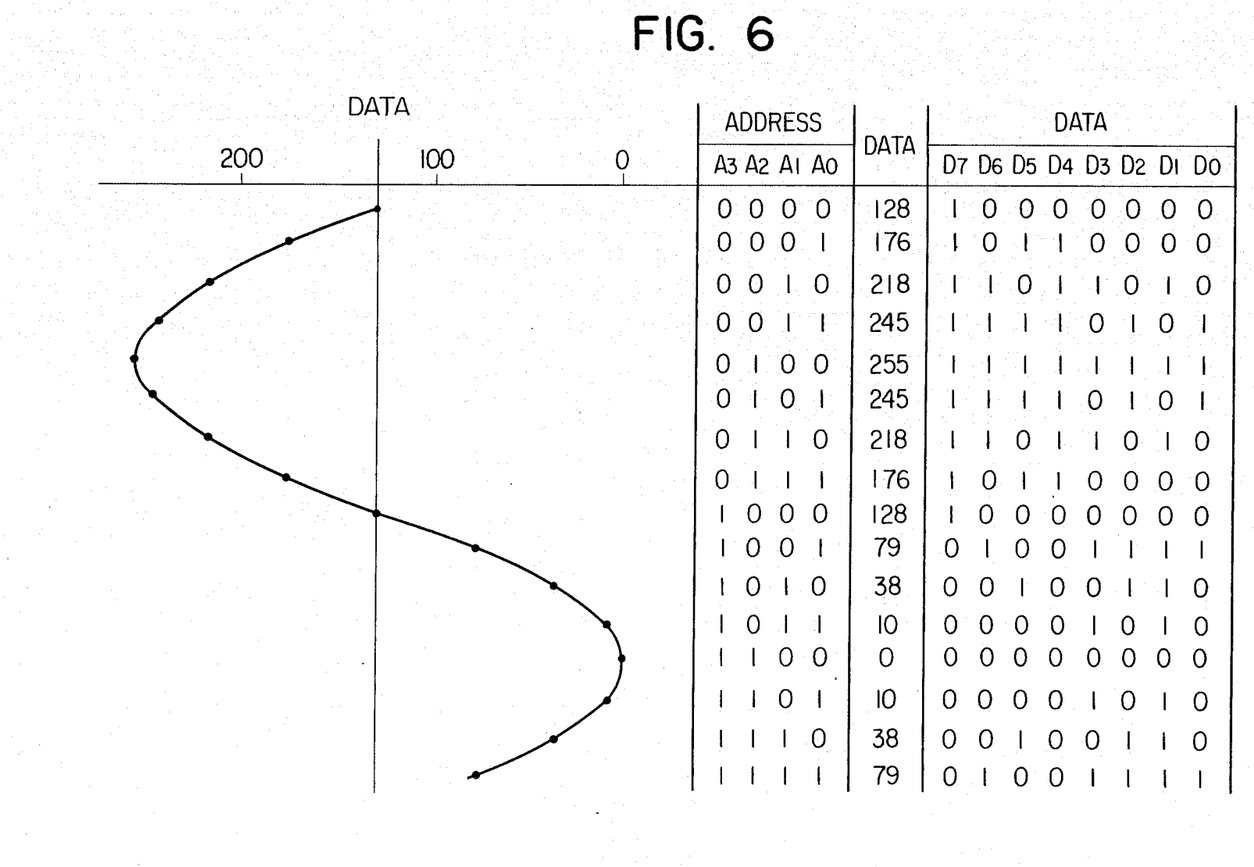
FIG. 6 is a table of abscissa and ordinate binary values representative of a sine wave prestored in a ROM of FIG. 1, and a corresponding sine wave.

FIG. 6 shows in tabulated form the data pre-stored in the ROM 24 which correspond to one period of a sine wave as shown in FIG. 4(a). In the FIG. 6, numerals $A_0$–$A_3$ designate ordinate values, while numerals $D_0$–$D_7$ designate respective abscissa values of the sine wave. It should be noted that, while in the FIG. 6 only four bits $A_0$–$A_3$ designating ordinate values are illustrated for the sake of convenience, the waveform is actually subdivided into 256 parts as illustrated by numerals $A_0$–$A_7$ and $D_0$–$D_7$ in FIG. 7. The respective rows of tabulated data are prestored in respective addresses 0-m in the ROM 24. The address m is required to be a multiple of three since the three phases are apart 120° with respect to each other.

Figure 7:
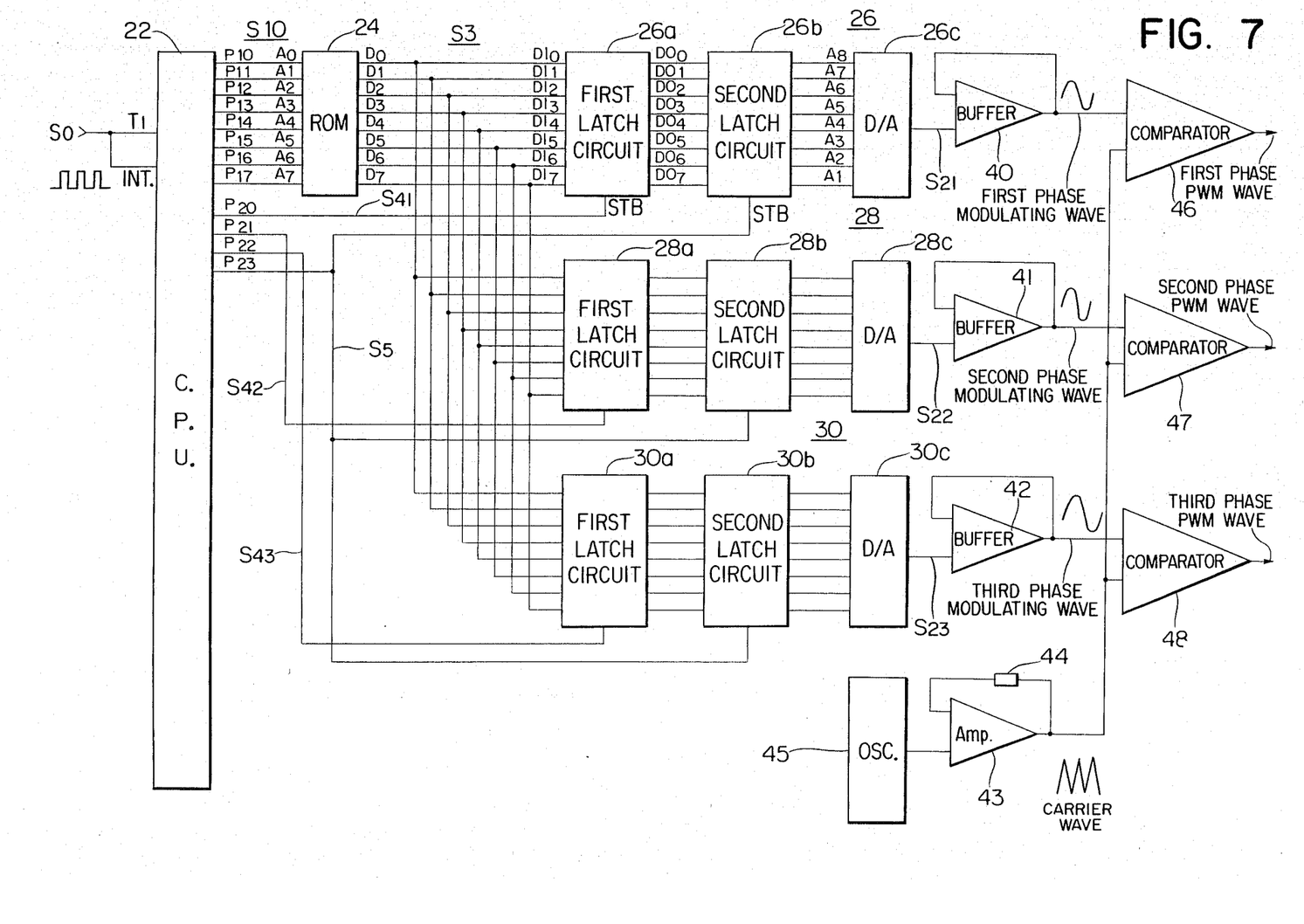
FIG. 7 is a schematic block diagram showing in more detail the embodiment illustrated in FIG. 3; and, FIGS. 8A and 8B are flow charts executed by a C.P.U in FIG. 3, according to the present invention.

FIG. 7 shows a schematic block diagram of the wave generation circuit according to the present invention.

Referring to FIG. 7, numeral 22 designates a central processing unit C.P.U. such as that manufactured by Mitsubishi as part no. M5L8748S, and numeral 24 designates a read only memory ROM such as that manufactured by Mitsubishi as part No. M5L2732. Numerals 26a, 28a and 30a designate first latch circuits which serve to latch the outputs of the ROM 24 in response to respective latch command signals $S_{41}$, $S_{42}$ and $S_{43}$, and numerals 26b, 28b and 30b designate second latch circuits which serve to latch the outputs of the respective first latch circuits 26a, 28a and 30a in response to the output timing signal $S_5$, and numerals 26c, 28c and 30c designate D/A converters which convert the respective digital signal outputs of the second latch circuits into analog values. The first latch circuts 26a, 28a and 30a, second latch circuits 26b, 28b and 30b, and the D/A converters 26c, 28c and 30c correspond to the first, second and third phase latch circuits 26, 28, and 30, respectively, shown in FIG. 3.

Commercially available circuits such as Mitsubishi M5L8282P may be used for the first and second latch circuits 26a, 28a, 30a, 26b, 28b and 30b, and MOTOROLA MC1408 may be used for the D/A converters 26c, 28c and 30c.

The outputs $S_{21}$, $S_{22}$ and $S_{23}$ of the D/A converter are connected to respective first inputs of buffers 40, 41 and 42, the second inputs of which are connected to the respective outputs thereof. The output of an oscillator 45 connects to a first input of an operational amplifier 43, the second input of which is connected to the output thereof through a resistor 44.

The outputs of the buffers 40, 41 and 42 are connected to respective first inputs of comparators 46, 47 and 48, the respective second inputs of which are connected to the output of the amplifier 43. Commercially available circuits such as NEC-µPC151 may be utilized for the buffers 40, 41 and 42 and for the amplifier 43, and NEC-µPC 157 for the comparators 46, 47 and 48, and INTERSIL-MC 8038 for the oscillator 45.

The outputs of the buffers 40, 41 and 42 provide first, second and third phase modulating waves, the output of the amplifier 43 provides a carrier wave and the output of the comparators 46, 47 and 48 provide first, second and third phase PWM waves produced by the comparators 46, 47 and 48 by comparing the first, second and third phase modulating waves with the carrier wave, respectively.

Figure 8A:
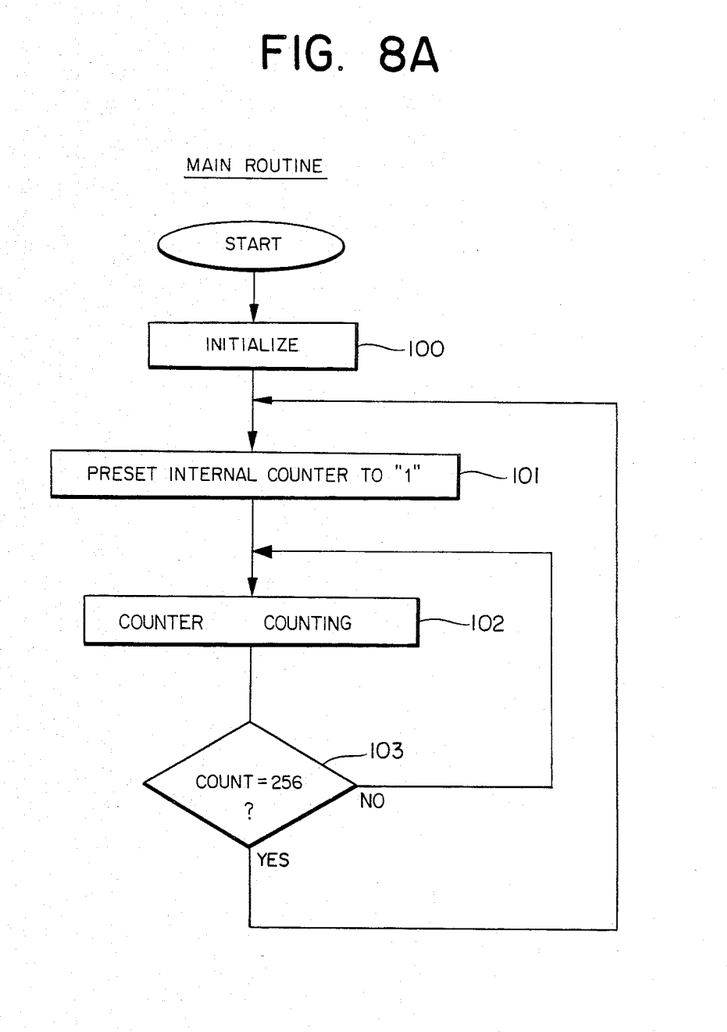
Figure 8B:
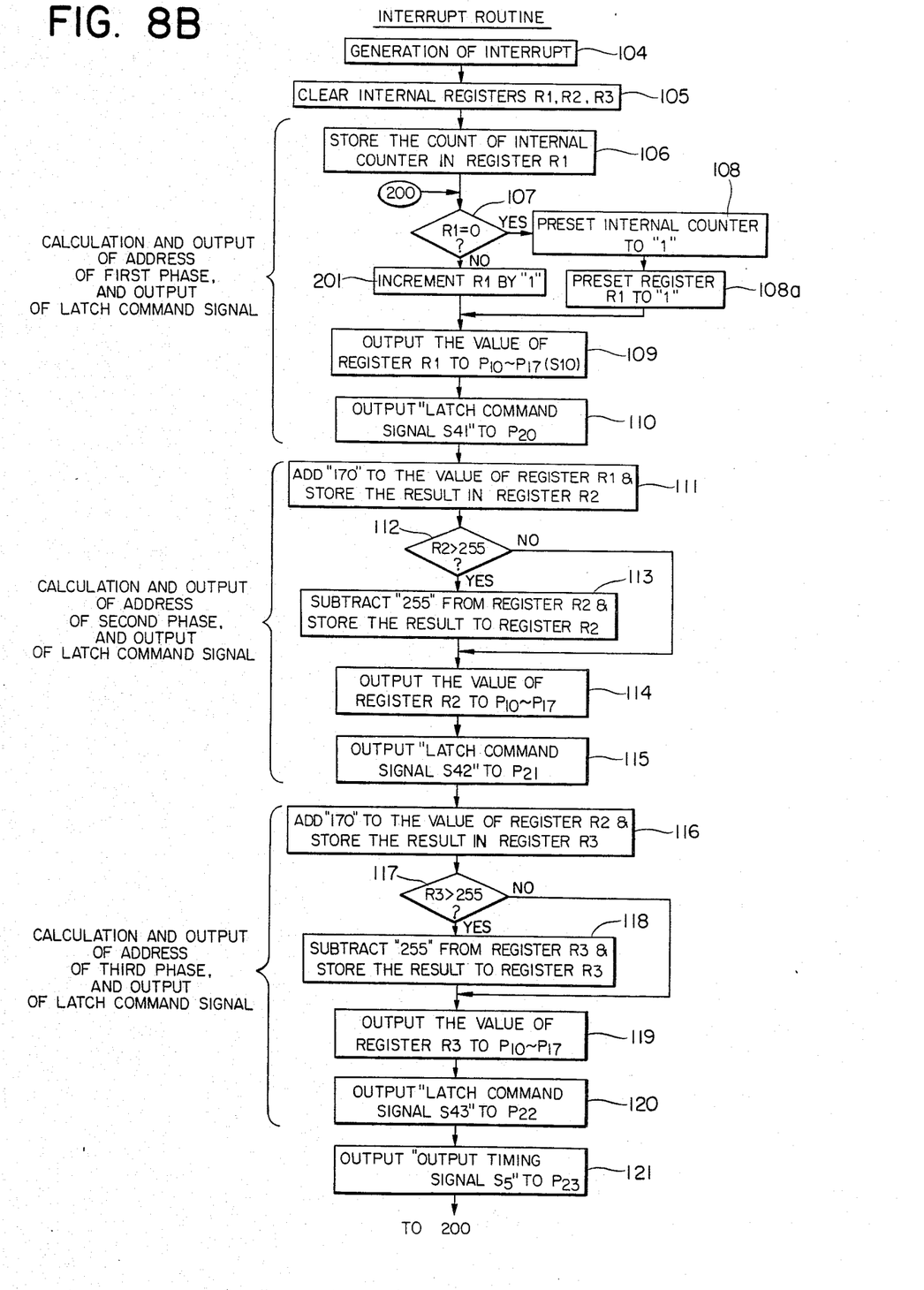

FIGS. 8A and 8B show flow charts of a main routine and an interrupt routine which are executed by the C.P.U. 22.

Referring to the FIG. 8A, in the main routine, after a start command is issued, the C.P.U. is initialized at step 100. At step 101, a counter in the C.P.U. (not shown) is set to 1. At step 102 the counter is allowed to start counting. The binary counter is an 8 bit counter for counting from 0–255 pulses. At step 103 it is determined whether or not the count of the internal counter has reached "256". Only if the answer is Yes, at step 103 is the program returns to step 101. Otherwise, the program returns to step 102 to allow the counter to continue counting.

In the interrupt routine, of FIG. 8B at step 104, an interrupt signal is generated by receiving a clock signal $S_0$ whose frequency is a factor of 255 of the modulated frequency. At step 105 internal registers $R_1$, $R_2$ and $R_3$ (not shown) are cleared. At step 106, the count of the internal counter is transferred to register $R_1$. At step 107, it is determined whether or not the contents of the register $R_1 = 0$. If at step 107 the answer is YES, namely the address of the register $R_1$ is at the initial state, the program counter is preset to 1 as the initial stage. The program then proceeds to step 108a where the register $R_1$ is set to 1, after which the program proceeds to step 109 where the contents of the register $R_1$ is outputted by the C.P.U. through lines $P_{10}$–$P_{17}$ as shown in FIG. 7 and as designated by $S_{10}$ in FIG. 3.

At step 110, the C.P.U. issues an output latch command signal $S_{41}$ on output line $P_{26}$, whereby the signals on the output lines $D_0$–$D_7$ of the ROM 24 are latched in the latch circuit 26a.

At the step 111, the binary equivalent of "170" which is $255 \times \frac{2}{3}$ is added to the contents of the register $R_1$ and the resulting value is stored in the register $R_2$.

At step 112, it is determined whether or not the contents of the register $R_2$ is greater than 255, (i.e. $R_2 > 255$). If at step 112 the answer is YES, the program proceeds to step 113 where the binary equivalent of 255 is subtracted from the contents of the register $R_2$ and the resulting value is stored in register $R_2$, after which the program proceeds to step 114. If at step 112 the answer is NO, the program proceeds to step 114.

At step 114, the contents of the register $R_2$ is outputted by the C.P.U. through the lines $P_{10}$–$P_{17}$.

At step 115, the C.P.U. issues an output latch command signal $S_{42}$ on output line $P_{21}$, whereby the signals on the output lines $D_0$–$D_7$ of the ROM 24 are set in the latch circuit 28a.

At step 116, the binary equivalent of "170" is added to the contents of the register $R_2$ and the resulting value is stored in the register $R_3$.

At step 117, it is determined whether or not the contents of the register $R_3$ is greater than 255 (i.e. $R_2 > 255$). If at step 117 the answer is YES, the program proceeds to step 118 where the binary equivalent of 255 is subtracted from the contents of the register $R_2$ and the resulting value is stored in the register $R_3$, after which the program proceeds to step 119. If at step 117 the answer is NO, the program proceeds to step 119.

At step 119, the contents of the register $R_3$ is outputted by the C.P.U. through the lines $P_{10}$–$P_{17}$.

At step 120, the C.P.U. issues an output latch command signal $S_{43}$ on output line $P_{23}$, whereby the signals on output lines $D_0$–$D_7$ of the ROM 24 are latched in the latch circuit 30a.

AT step 121, the C.P.U. 22 issues an output timing signal $S_5$ on output lines $P_{23}$, whereby the signals previously set in the latch circuits 26a, 28a and 30a are passed through and latched in the latch circuits 26b, 28b and 30b, respectively. Accordingly, the respective binary signals from the latch circuits 26b, 28b and 30b are converted to first, second and third pulse width modulation signals by the buffers 40, 41 and 42, and comparators 46, 47 and 48, respectively.

At step 200, the program goes back to step 107 where if $R \neq 0$ or the answer is NO, which means that the initial stage has passed, the program proceeds to step 201.

At step 201, the address stored in the register $R_1$ is incremented by "1" as indicated by Equation (2).

After step 201, the program proceeds to step 109 and the same operation as noted above will be repeated.

It is to be noted that while the illustrated embodiment uses a microcomputer as an operation circuit, the operation circuit may be formed by an integrated circuit element such as a memory element, and other memory elements such as EP-ROM may be employed, or memory elements included in the microcomputer may be used. Furthermore, it will be apparent to one skilled in the art that although in the above embodiment the stored reference waveform data is for a regular sine wave, the stored reference waveform data may be for other types of waves, such as a half wave or, a quarter wave of a sine wave, and still fall within the scope of the present invention.

Since in the present invention a wave generation circuit for a pulse width modulation inverter apparatus is formed from a memory element having reference waveform data stored therein, an operation circuit for controlling the address of the memory element, and phase latch circuits controlled by the operation circuit for latching the output data from the memory element to obtain the waveform data for the generated waves by using a single memory element, it is advantageous in that a memory element is effectively utilized, resulting in a cheap apparatus while only a single memory element may be modified in contents in correspondence with the modification of the waveform, making modification simpler.

It is to be noted that the present invention is not limited to the described and illustrated embodiment and that it is possible to make various modifications without departing from the spirit of the invention.

What is claimed is:

1. A wave generation circuit for a pulse width modulation inverter for receiving an input signal of a predetermined frequency and for generating a plurality of waves of differing phases which are modulated so as to form driving signals for switching elements in the pulse width modulation inverter, comprising:
a memory means for storing reference waveform data for the generated waves at a plurality of addresses;
an operation means for receiving said input signal and for providing a phase address signal and a phase latch command signal for each of said phases and an additional output timing signal in response to said input signal, the difference between the addresses indicated by said phase address signals corresponding to the phase difference between said generated waves, and for transmitting said phase address signals to said memory means so as to cause said memory means to output reference waveform data corresponding to each phase stored at the addresses indicated by said address signals;

a plurality of phase latch means each having a plurality of latch elements, each of said latch means receiving its respective phase latch command signal from said operation means in synchronism with its respective phase address signal so as to latch the corresponding stored reference waveform data comprising a plurality of parallel data bits equal in number to said plurality of latch elements and received from said memory means and said plurality of phase latch means receiving said output timing signal from said operation means when the corresponding stored reference waveform data for each phase is latched so as to cause said plurality of phase latch means to output the latched data as a plurality of parallel data bits equal in number to said plurality of latch elements;

wherein said operation means provides new phase address signals at predetermined intervals so as to cause said plurality of phase latch means to transmit waveform data forming the generated wave for each phase.

2. A wave generation circuit for a pulse width modulation inverter according to claim 1, wherein the length of said predetermined intervals are calculated so as to be proportional to the reciprocal of the product of the number of addresses of said memory means times said predetermined frequency of said input signal.

3. A wave generation circuit for a pulse width modulation inverter according to claim 1, wherein the addresses indicated by any two of said address signals for different phases differ from one another by an integral multiple of m/n, where m is the number of addresses of said memory means and n is the number of said phases.

4. A wave generation circuit for a pulse width modulation inverter according to claim 3, wherein said operation means sequentially provides said address signals for each of said phases, and said memory means sequentially outputs said reference waveform data stored at the addresses indicated by said address signals.

5. A wave generation circuit for a pulse width modulation inverter according to claim 4, wherein said operation means sequentially transmits each of said phase latch command signals to a predetermined one of said plurality of phase latch means in synchronism with the address signal from the corresponding phase so as to latch said reference waveform data of said memory means in said predetermined latch means.

6. A wave generation circuit for a pulse width modulation inverter according to claim 5, wherein said operation means simultaneously transmits said output timing signal to all of said plurality of phase latch means when all of said plurality of phase latch means have completed their latch operation so as to cause said plurality of phase latch means to output their respective latch data.

7. A wave generation circuit for a pulse width modulation inverter according to claim 1, wherein said memory means comprises a single ROM.

8. A wave generation circuit for a pulse width modulation inverter according to claim 2, wherein said memory means comprises a single ROM.

9. A wave generation circuit for a pulse width modulation inverter according to claim 3, wherein said memory means comprises a single ROM.

10. A wave generation circuit for a pulse width modulation inverter according to claim 4, wherein said memory means comprises a single ROM.

11. A wave generation circuit for a pulse width modulation inverter according to claim 5, wherein said memory means comprises a single ROM.

12. A wave generation circuit for a pulse width modulation inverter according to claim 6, wherein said memory means comprises a single ROM.

* * * * *